Patented Feb. 9, 1932

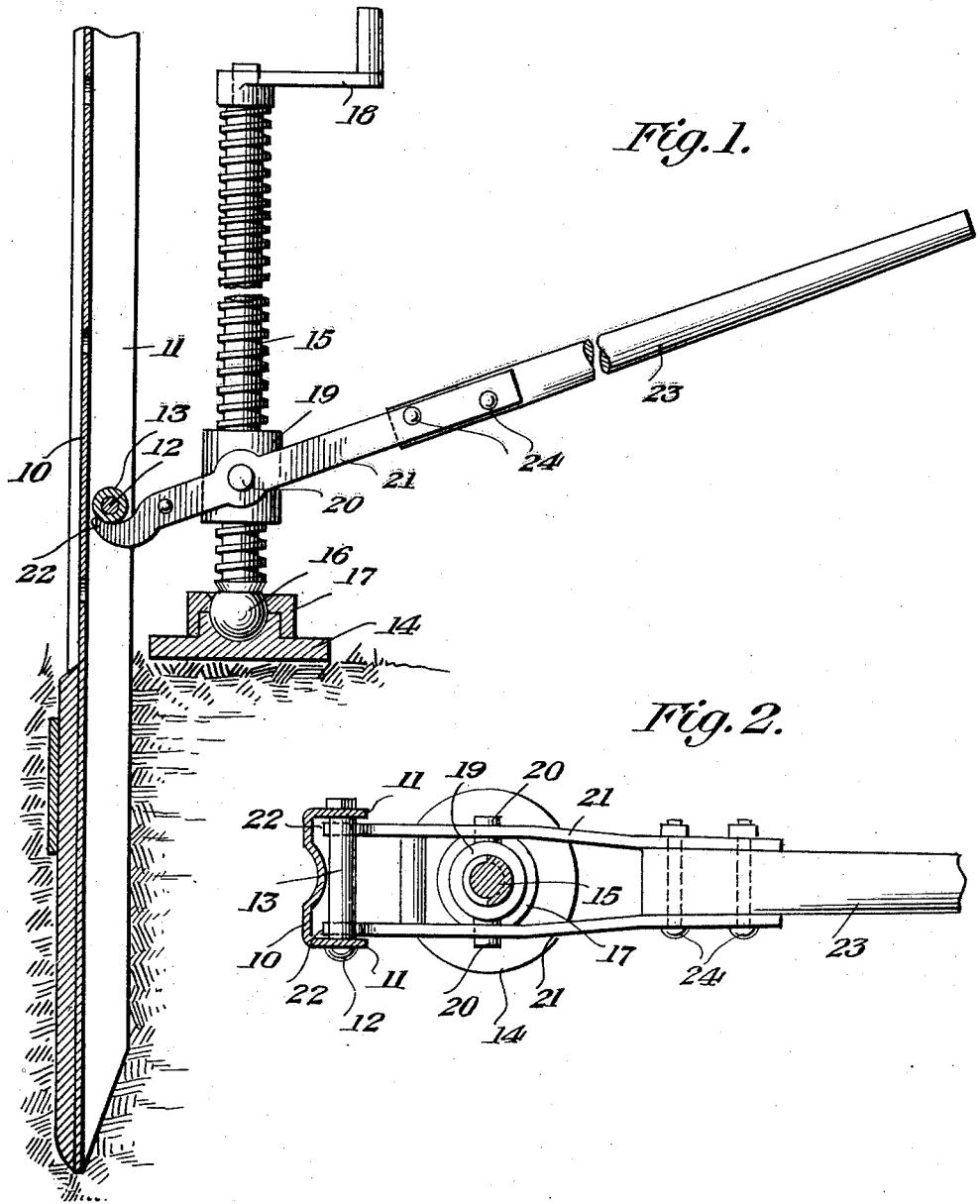

1,844,809

UNITED STATES PATENT OFFICE

CHARLES A. SPAUGH, OF DURHAM, OKLAHOMA

FENCE POST LIFTER

Application filed January 27, 1930. Serial No. 423,839.

The present invention contemplates the provision of a fence post lifting device, constructed to permit the post to be extracted from the ground with a minimum of effort, and capable of adjustment to meet all conditions and requirements, the invention residing in the construction, combination and arrangement of parts as claimed.

In the drawings forming part of this application like numerals of reference indicate similar parts in the several views, and wherein:—

Figure 1 is a view in side elevation of the lifting device showing the manner in which it is used.

Figure 2 is a fragmentary plan view.

Referring to the drawings in detail, 10 indicates a fence post preferably constructed of metal and of U-shape formation in cross section, the opposed parallel side flanges 11 of which are strengthened and reinforced by a connecting bolt 12 upon which is mounted a spacing sleeve 13.

The lifting device forming the subject matter of the present invention comprises a base 14 upon which is mounted an adjusting screw 15, the latter being preferably provided with a ball or spherical shaped end 16 which is seated in a recess formed in the base and held associated therewith by means of a retaining ring or clamp 17. The upper end of the adjusting screw 15 is provided with a handle 18 of any suitable construction, and by means of which the screw can be manipulated as the occasion may require.

Threaded upon the screw 15 is a collar 19, and projecting from this collar at diametrically opposite points are pivot lugs or pins 20 upon which the lifting lever is mounted. This lever preferably comprises spaced members 21, which have their corresponding forward extremities terminating to provide hooks 22, while clamped between the opposite extremities of the members 21 is a handle 23. This handle is preferably secured between the members of the lifting lever by bolts 24, and it will be noted upon inspection of Figure 1 that the bolts are arranged above and below the longitudinal center line of the handle to relieve the latter of undue strain incident to the use of the tool.

The tool is used in a manner illustrated in Figure 1, wherein it will be noted that the hook-like extremities 22 of the lifting lever are arranged beneath the spacing collar 19 of the fence post, and by depressing the handle 23 the post is partly elevated from the ground. After each operation of the handle 23 the adjusting screw 15 is rotated by means of the handle 18, thereby moving the collar 19 upwardly upon the screw, until the lifting lever is again properly positioned with relation to the sleeve 13, whereupon the handle 23 can be again operated to further extract the fence post 10.

While it is believed that from the foregoing description the nature and advantages of the invention will be readily apparent, I desire to have it understood that I do not limit myself to what is herein illustrated and described and that such changes may be resorted to when desired as fall within the scope of what is claimed.

What I claim is:—

A fence post lifting device of the character described comprising a base, a rotatably mounted threaded adjusting screw swivelly associated with the base, a handle for rotating said screw, a collar threadedly mounted on the screw for sliding movement thereon, and a lifting lever pivoted on the collar and formed with terminal hook like extremities for the purpose specified.

In testimony whereof I affix my signature.

CHARLES A. SPAUGH.